(12) United States Patent
Lungu

(10) Patent No.: US 6,724,117 B1
(45) Date of Patent: Apr. 20, 2004

(54) STATOR OF AN ELECTRONICALLY SWITCHED TWO-PHASE RELUCTANCE MACHINE

(76) Inventor: Iancu Lungu, Str. Trapezului nr. 5, G1A ap-40, RO-74381 Bukarest 3 (RO)

( * ) Notice: Subject to any disclaimer, the term of this patent is extended or adjusted under 35 U.S.C. 154(b) by 0 days.

(21) Appl. No.: 09/744,644

(22) PCT Filed: Apr. 21, 2000

(86) PCT No.: PCT/RO00/00010
§ 371 (c)(1),
(2), (4) Date: Aug. 22, 2001

(87) PCT Pub. No.: WO00/74204
PCT Pub. Date: Dec. 7, 2000

(30) Foreign Application Priority Data

May 26, 1999 (RO) .............................. 99-00601

(51) Int. Cl.⁷ ................................ H02K 3/00
(52) U.S. Cl. ...................... 310/179; 310/254
(58) Field of Search ................ 310/179, 185, 310/186, 254, 258, 259, 89

(56) References Cited

U.S. PATENT DOCUMENTS

| 4,895,536 A | 1/1990 | Gingerich et al. | |
|---|---|---|---|
| 5,365,137 A | * 11/1994 | Richardson et al. | 310/258 |
| 5,866,965 A | 2/1999 | Baronosky et al. | |
| 6,262,510 B1 | * 7/2001 | Lungu | 310/254 |

FOREIGN PATENT DOCUMENTS

| DE | 35 32 818 A1 | 3/1987 |
|---|---|---|
| DE | 42 33 679 C1 | 12/1993 |
| DE | 44 01 847 A1 | 7/1995 |
| EP | 0 289 292 | 11/1988 |
| FR | 2 644 641 | 12/1989 |
| WO | WO 90/11641 | 10/1990 |
| WO | WO 96/09683 | 3/1996 |
| WO | PCT/RO00/00010 | 4/2000 |

* cited by examiner

Primary Examiner—Thanh Lam
(74) Attorney, Agent, or Firm—Kelly Bauersfeld Lowry & Kelley, LLP

(57) ABSTRACT

A field part of an electronically switched two-phase reluctance machine includes a plurality of individually wound U-shaped yoke assemblies. Each assembly includes winding carrying U-shaped magnets attached to a non-magnetic carrier frame. Each yoke assembly has winding connections which are interconnected by a form-defined, axially mountable electric conductor compound. Power conducting electric components are electrically connected to the electric connector compound as well.

26 Claims, 4 Drawing Sheets

Figure 3:
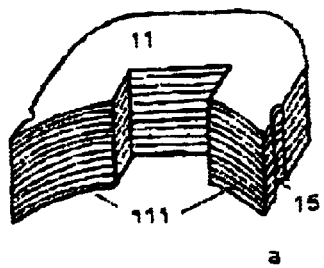
Figure 3:
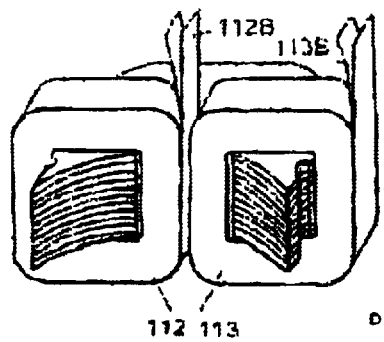
Figure 3:
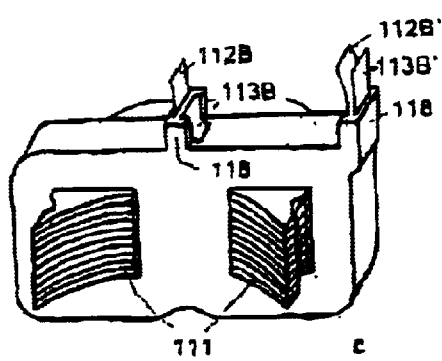

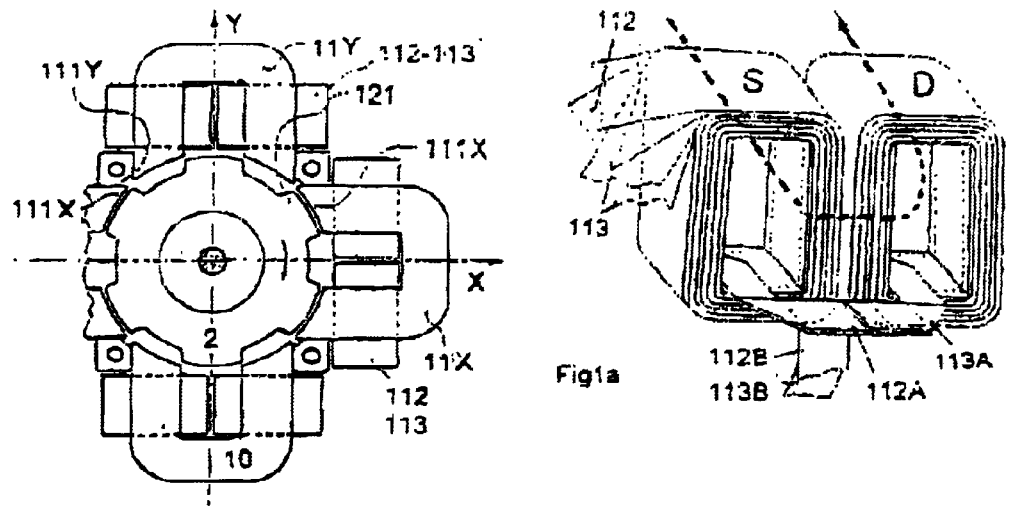
Fig.1
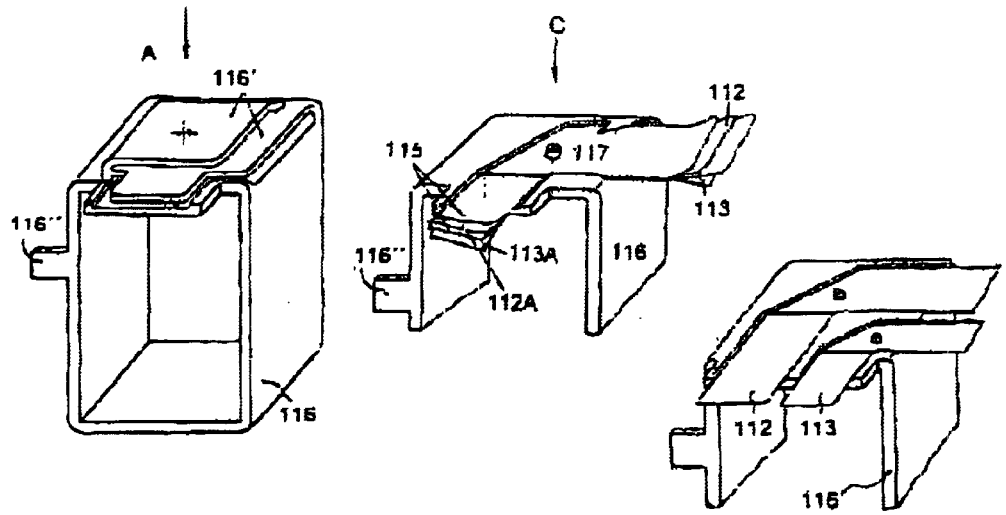
Fig.2
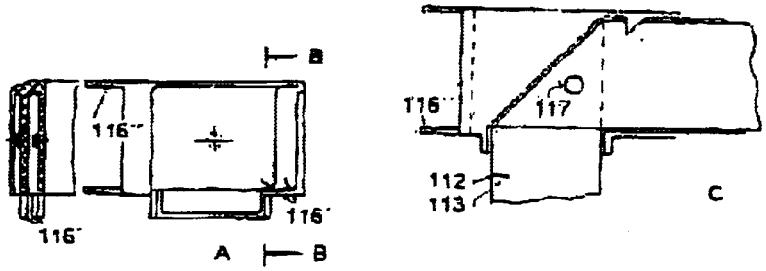

STATOR OF AN ELECTRONICALLY SWITCHED TWO-PHASE RELUCTANCE MACHINE

BACKGROUND OF THE INVENTION

The invention relates to the winding carrying part of electronically switched reluctance machines with separate electromagnets. In the course of the specification, we shall call this part "field part" or "stator". The reluctance machines are sometimes called SR (switched reluctance) machines. Such machines are known by the prior art from the international patent applications WO 96/09683 and WO 98/23024. The first document knows a reluctance machine which has no stator but two independent opposed rotors, the conventional stator becoming the outer rotor because of a special bearing. This rotor (field rotor), similar to a stator, can also be realized according to the teaching of this invention.

The invention offers technological solutions for the realization of the stator of common machines or of the field rotor of the double rotor machines with a particular structure. For other parts of these machines (rotor, bearing), sufficient methods of production are known by the prior art. Unlike conventional motors (see FIG. 1), the stator has four independent yokes 11 which are equipped with respectively two cantilever windings each which are to be produced separately.

However, these machines mentioned by the prior art, which are basically very simple with electromagnets which are to be set in separately have to be realized with appropriate manufacturing techniques in order to produce mechanically, for example, the numerous electric connections of the windings or to guarantee the observance of a constant air gap as small as possible.

DETAILED DESCRIPTION OF THE PREFERRED EMBODIMENTS

The aim of this invention is to indicate possibilities how the basically unique winding carrying parts of these machines can be economically produced by observing the above mentioned requirements.

The aim of the invention is achieved according to the teaching of the main claim. The subclaims refer to detailed embodiments of the components necessary for the assembly of the stator. To simplify, we took as an example in the course of the specification a SR motor (FIG. 1, cross section), as described in the WO 96/09683, with four U-shaped yokes 11 made of bundles of laminations which carry a bifilar winding 112–113 made of metal bands which are here called U-shaped magnets 10.

The ways to reach the aim which are described here can also be used for other configurations of SR machines by simply adapting. The windings 112–113 necessary to produce the U-shaped magnets 10 are wound from two metallic bands or wires with intermediate insulating foils (bifilar main winding 112 and secondary winding 113). Since the winding band unlike the usual copper band has a preferred bending direction and does not need to be insulated, the mechanical working out of the winding connections (for example by folding, stamping, ultrasonic welding) is considerably simplified. For the winding fabrication, the beginnings 112A, 113A of the bands are, for example, folded with intermediate mylar foils 115 to 90° and bored through in the folding area in order to thus be hung up on the winding core 116 (FIG. 2). As may be seen here, the winding core 116 has two moulded brackets 116 with clip hooks which insulate the beginnings of the main and of the secondary windings (112A, 113A) with each other. The latter penetrate into the bore hole 117 from the folding area of the beginnings of the bands, what allows the electrically/mechanically separate fixing of the two pilot bands 112, 113 opposite the wound core. The wound core 116 with a rectangular cross section can, as usually, have lateral edges for being wound with wire, these lateral edges being not necessary for the embodiment with winding bands (FIG. 2).

The wound core 116 will then be wound correspondingly to the number of windings in order to simultaneously wind the main winding (112) and the secondary winding 113. The end of the winding will then be preliminarily fixed by means of the lateral brackets 116' so that the windings do not spring back after having cut the winding band. Respectively two windings are connected in series. A parallel connection of the windings is also possible, for example when it is the matter to use the same windings for a voltage which is twice lower. The windings 112–113 pushed through on the left (D) and on the right (S) on the yoke 11 are operationally connected with each other (beginning 112 left, beginning 112 right, beginning 113 left, beginning 113 right).

With reference hereto, the beginnings of the windings bent parallel to the U-shaped limbs are folded once again in direction of the middle part of the U-shaped yoke 11 (FIG. 1 indicated by a fat dashed line, wound core not drawn). The left and right arriving overlapping beginnings 112A, 113A of the pilot bands 112 and 113 can be soldered or ultrasonically welded and thus be mechanically and electrically connected with each other. This action can take place before as well as after the mounting of the windings onto the U-shaped bundles of laminations 11. The further electric connection of the band conductors connected in series 112 and 113 then takes place at the ends of the left or of the right winding. See FIG. 1a to FIG. 3. For this purpose, their ends 112B, 113B are cut in the manner of a plug (bent or stamped) or (for example for wire windings) equipped with independent plug lugs.

Figure 8:
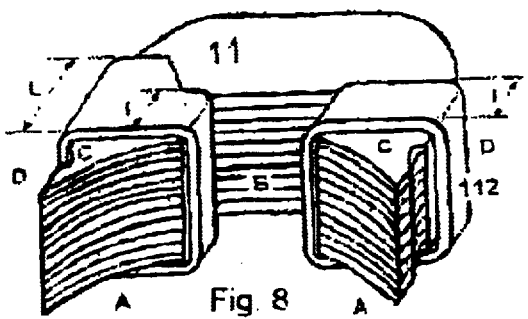
Figure 9:
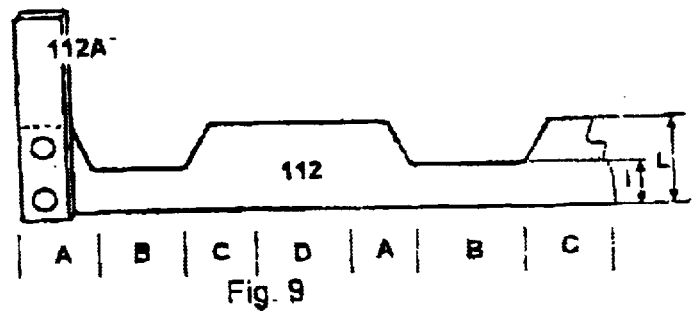

The use of the U-shaped yokes 11 allows the use of a special winding with a lower resistance which results from a partial increase of the width or of the cross section of the winding band. The section of each winding which is situated between the U-shaped limbs has the usual width I which is a little smaller than the limb height, whereby the remaining winding with the height L can be considerably wider (Page B, FIG. 8. Here on the left, the new winding type is drawn, the old one on the right for comparison, respectively only the first winding). This is possible because the winding band width here (pages A, C, D) is no longer limited by the depth of the U-shaped yoke 11. The developed view of a winding (pages A, B, C, D) can be seen in FIG. 9. Here, the beginnings of the winding are realized (as an example) by means of separate connecting parts 112A', 113A' (page A) which can be ultrasonically welded. In this way, for example an aluminium winding can be provided with copper connections easy to be soldered (112A'). This winding type can be realized more easily on motors with a few windings and allows an increasing of the power yield or the reduction of the iron quantity (iron losses). For the same resistance or the same ampere turns compared with the embodiment with a constant cross section (FIG. 1a), yokes with shorter limbs, thus with less iron, can be used here. The magnet 10 consisting of an U-shaped yoke 11 with two windings 112–113 is the basic component for the production of the stator 1 according to the invention, see FIG. 3.

FIG. 3a shows the U-shaped yoke 11 with pole faces 111 and lateral fixing grooves 15 which has been bundled from punched steel sheet by a method known from the prior art. FIG. 3b shows the yoke with two windings according to FIGS. 1 and 2 as before the extrusion operation. FIG. 3c shows the U-shaped magnet 10 which has been extruded, for example, with a thermoplast, at least one side of the electromagnet being provided with pole faces 111 which are turned to a movable part 2 (rotor) over an air gap. Here, fixed, spatially precisely fitted plug lugs 112B–113B, 112B'–113B' are constituted by the ends of both windings. One side of the plug lug 112B forms the connection with the main winding (112), the other 113B with the secondary winding 113. For this purpose, the tool must be configured in such a way that plastic is injected for reinforcement between the plug lugs 112B–113B which are squeezed in the injection moulding matrix during the injection moulding process. With respect to the tool technique, it is easier to extrusion-die the bands 112–113 a few millimeters from the winding edge (height of the shoulder 118). The still free ends of the bands (112B, 113B) which remained bare (they were clamped in the tool) will be bent over the plastic shoulder like the end 113B, see for example FIG. 3c, in order to thus form the plug lugs. Because all magnets necessary for one or several machine types are identical, they can be mass-produced at low costs (automatized production). The mechanically easy to handle U-shaped magnet 10 can be inserted/fixed in a frame 5 in order to form the stator 1, see FIG. 4b. For most of the motors (of the invention), the fixing to the frame 5 thus takes place over the outer corners of the U-shaped magnets in the area of the stator poles 111, thus in immediate air gap proximity so that the windings remain on the outside, even if the rotor space 20 is connected. This is desirable, all the more since dirt particles could block the rotor 2. This new mechanical construction also allows for a better cooling. Moreover, short fixing ways are thus possible between the rotor pole faces (121) or the stator pole faces 111 which allow a better observance of the very important narrow tolerances in the air gap area. FIG. 5 schematically shows with fat indicated lines a comparison of the length of the fixing ways (from bearing to bearing) between the rotor poles 121 and the stator poles 111 for common motors (left) or for a motor according to the invention (right). For common motors (left), the windings (113) are under the end shields (fett indicated line). The motor frame (FIG. 4) fixes the yokes 11 of the magnets 10 and positions the stator 1 and the corresponding components with respect to the rotor 2. In the simplest form, it consists of a basic frame 5' with columns 53. In the embodiment for field rotors of statorless machines, this frame 5 is configured as symmetrical as possible and without balance error (like, for example, in FIG. 4c), since it rotates with the four U-shaped magnets 10. It is constructed in this way so that the motor is sufficiently secured against extraction forces (caused by the centrifugal force) of the U-shaped magnets 10. The motor frame 5 has mounting shoulders or nests for this purpose which allow (alternative according to FIG. 4c) that the electric parts are positioned exactly on the flange 5'. The frame is preferably diecasted from an aluminium alloy.

Figure 4:
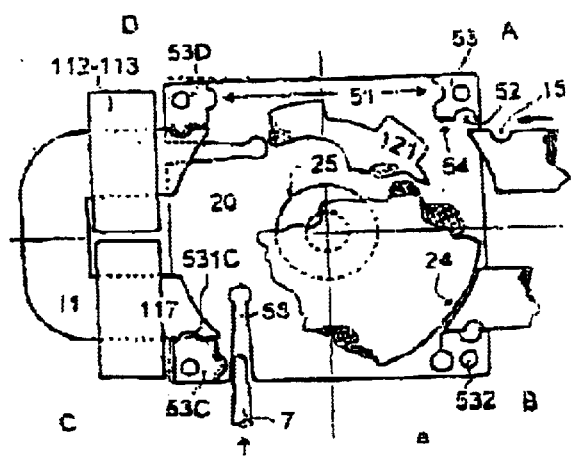
Figure 5:
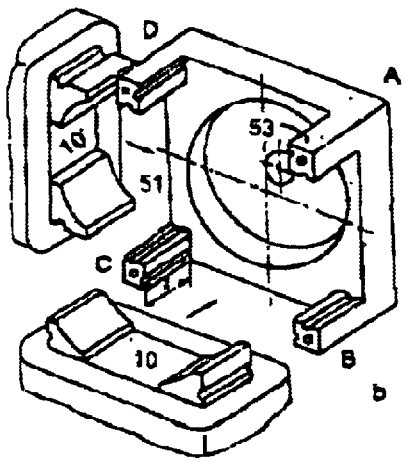
Figure 5:
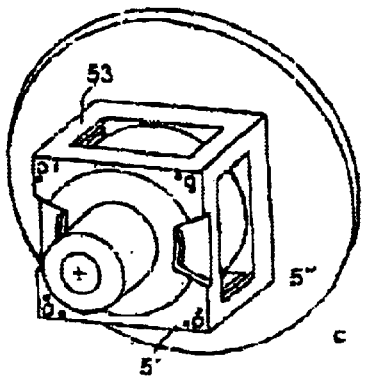
Figure 5:
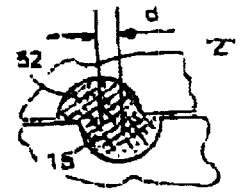
Figure 5:
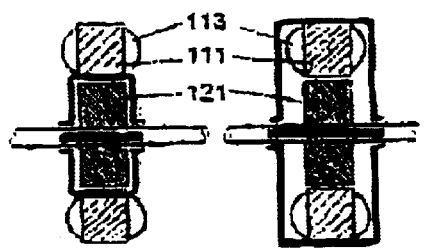
Figure 5:
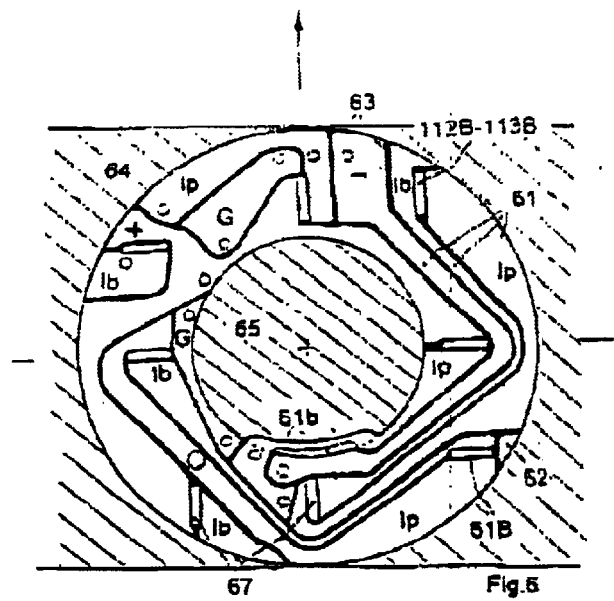

The frame 5 has openings 51 in which the ends of the U-shaped yokes 11 are inserted, the lateral walls thereof having for example half-round axially aligned grooves 52 which are opposite other half-round grooves 15 which are made in the outer corners of the U-shaped magnets 10, see FIG. 4. The four openings 51 are formed by four columns 53 which run from the front end shield to the rear (removable) end shield. On the inner sides 54 of these columns, the fixing of the U-shaped yokes 11 is carried out by appropriate methods, as follows. As can be seen in FIG. 4, left half (quadrant C and D), the magnets 10 can be inserted vertically to the plane of the drawing between the two columns 53C, 53D. The half-round webs 531C, 531D engage in the lateral fixing grooves 15 of the U-shaped magnets 10. However, this requires, because of the tolerances, a high-accuracy fabrication.

In order to fix the U-shaped yokes 11 free from backlash, it is possible to spread out the columns 53 when mounting. For this purpose, the basic plate of the frame 5 has for example four wedge-shaped notches 58. These notches will be widened during the assembly with wedges 7 so that the columns 53 spread approximately 0.1 mm outwards (corners dashed in the left drawing half). Thus, the yokes 11 can be inserted (with clearance) more easily. The columns 53 which spring back tense the yokes 11 free from backlash, when the wedges 7 are removed. Due to this method, the magnets can however only be mounted in axial direction and the upper ends of the columns 53 are free. The frame 5 can thus be closed with a flat rectangular end shield over the bore holes 532, the columns 53 having the length of the bundle of laminations of an U-shaped yoke. It is also possible to use two half frames which are preferably identical, as in FIG. 4b, where the four columns 53 are half as long as the bundles of laminations so that the yokes 11, or the rotor, are clamped between the two, "half frames", thus without separate end shield.

A construction with two half frames is also possible, each half frame being equipped with two columns 53 each (alternative 1, columns A and C, alternative 2 columns A and B) which have the length of the bundle of laminations. An appropriate assembly can also be achieved by pushing together the two half frames over the four yokes with an offset angle (about 90° or 190° depending on alternative 1 or 2). A higher assembly accuracy, even with rough toleranced (cheap) parts, can be achieved by means of a tolerance compensating method with so-called "liquid rivets".

Due to the curing of the "liquid rivets", parts with rough tolerances can be mutually fixed precisely in any position in order to respect narrow tolerances at a decisive point when assembling. For this purpose, the method is as follows.

A calibrating roll 24, the outer diameter of which is bigger than the rotor diameter by the air gap dimension and which is centered over the bearing 25, is inserted in the rotor opening 20. The U-shaped yokes 11 are radially pushed into the motor frame 5, for example the one after the other from the same direction (by gradual torsion of the motor frame 5 per step of assembly). Moreover, the four columns 53 of the frame 5 can also be connected above the yokes 11 by a ring (flange (5")) which allows the removal of the calibrating roll and the insertion of the rotor (FIG. 4c). With an appropriate device, all U-shaped magnets 10 are then pressed with the pole faces against the calibrating roll 24 and immovably fixed in this position by injection of a zinc alloy in the opposite half-round grooves 52, 15. Instead of the zinc alloy, any hardenable material may be injected. For the assembly of the magnets 10, instead of pressing from outside, their electromagnetic retention force can be used in case these magnets are flown through by current, whereby the calibrating roll 24 must then be magnetic.

In this way, not only a retention force can be achieved, but also the quality of the assembly can be checked. If one of the magnets 10 does not correctly sit close to the calibrating roll (for example because of the dirt accumulation on the pole faces) or if there is a winding connection, the reluctance of this magnetic circuit differs from a predetermined value what can be checked over the course of the voltage variation in case of a quick current variation. So, it is possible not only to simplify the assembly but also to check the quality of the mechanical electric properties of one magnet or of all magnets and of their connections. As may be seen in the right half of FIG. 4, in the quadrants A and B, see detail "Z", it is not necessary here that the half grooves 15, 52 exactly correspond with each other. When the pole faces 111 are in the optimal functional position at the stop with the roll 24, the half-round grooves 15, 52 can be offset by a distance d which results from the tolerance wedges. The injected hardenable material (zinc alloy, plastic, resin) fills the hatched space and so forms a bolt after hardening, whereby a tolerance compensation takes place. It is also conceivable to quickly inject a pin softened by heating in the grooves 52-15 between the U-shaped magnets 10 and the frame 5 and to immediately upset it (in plastic state) with a drift so that it fills the existing hollow spaces 52 15 like the liquid rivet. It is also possible to widen an extensible small tube by means of an inner pressure which locks the magnets (10) against the frame 5 in the art of a laterally extendible bolt. It is also possible to realize a fixing with fixing components (pins, screws). Hereby, however narrow tolerances must be worked with because the tolerance adaptation to a calibrating roll does not take place any longer.

After having removed the calibrated bumper roll 24, the pole faces 111 of the U-shaped magnets define exactly the diameter of the rotor space 20 and thus the exact observance of the air gap. The motor is fixed to the frame 5. Additionally, the motor frame 5 serves, for example in the area of the flange 5", as a cooler for the transistors 21 and the power diodes 22. In special embodiments, extensions of this frame can be configured as motor casing or as pump case. In the same way, this frame 5 can be formed as an extension of another body (gearbox body, pump set etc.).

FIGS. 4b, c show perspective views of two alternatives of the frame 5, the c-alternative being provided for the radial assembly of the U-shaped magnets.

Figure 6:
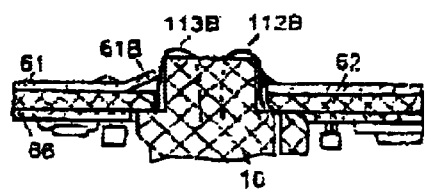

The connection of the plug lugs 112B–113B of all U-shaped magnets with each other takes place, considering the high currents which these machines have, especially with low voltage (motor vehicle applications), by means of a conductor compound 6, see FIG. 6, which is produced at low cost by punching or laser cutting. This conductor compound 6 produced from metal sheet conductors 61 (copper, aluminum or brass) with a thickness in the mm range and an insulating support 62, should connect electrically all plug lugs 112B, 113B of all U-shaped yokes 10 at the same time, and eventually other high voltage conducting parts. The electric contact with the plug lugs 112B, 113B of the U-shaped magnets 10 can take place over welded, soldered or crimp connections or by pressure. The conductor paths 61 of the compound are similar to the conductor paths of an usual printed circuit and must be punched instead of being engraved only because of the material thickness. In order to fit or fix the conductor paths 61 on an insulating support 62, it is appropriate to carry out the punching or cutting out operation in two separate phases, as follows (FIG. 6).

First, the separating paths 63 (drawn as fat black lines) in the not shaded area of the later conductor paths 61 are cut out from a material which is, for example, shaped as a strip so that the remaining conductor paths 61 due to connections to the edges 64 and inner areas 65 which are to be cut later do not fall out loosely from the plane of the original strip.

The conductor paths 61 which can still be handled with in all as an unit are fixed into an insulating support 62, either by die extrusion with plastic (on one or two sides), clipping, ultrasonic riveting or sticking.

The excess edges 64 and inner areas 65 which still exist only for handling purposes are cut off and the contact lugs (FIG. 6a) bent or finished. Thus, the conductor compound is finished. FIG. 6 shows as an example a finished round conductor compound which is appropriate for a motor with four U-shaped magnets 10 with main windings (112) and secondary windings 113. The punched conductor paths 61 are placed on an insulating support plate 62 with eight slits 67 for passing through the plug lugs 112B, 113B of the U-shaped magnets. The characters placed on their faces mean:

Ip=connections of the/between the sections of the main windings 112 (main current), Ib=connections of the/between the sections of the secondary windings 113 (bypass current)

+–connection on the positive (plus) pole

−–connection on the negative (minus) pole

G–connections of the gate electrode,

As the partial cross section, FIG. 6a, shows, the ends of the conductor paths 61B which are connected with the plug lugs 112B, 113B of the U-shaped magnets 10 can be bent obliquely upward so that they can contact the latter in the art of a plug-in connection.

Figure 7:
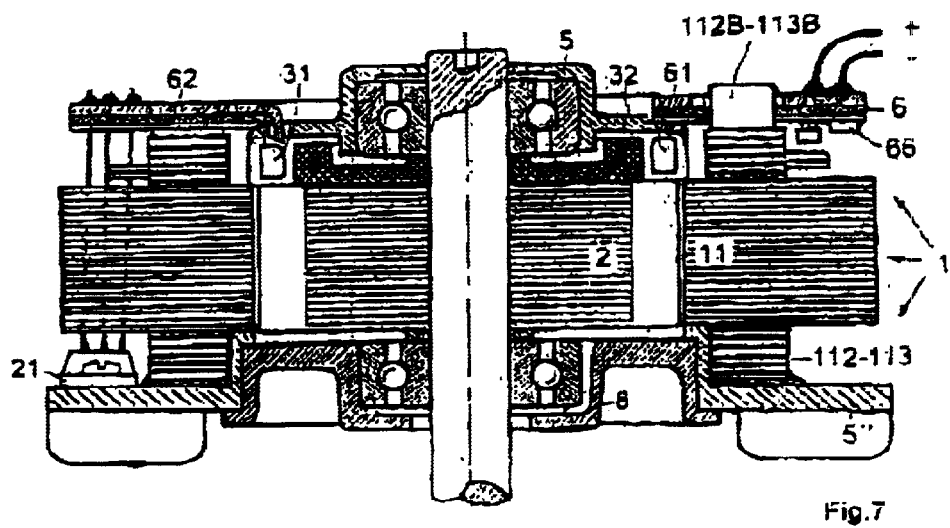

A loop 61b of the connection of the main winding 113 can be brought to another plane, for example by pressing in order to serve, for example behind the Hall sensor 31, as a magnetic feedback of the main current Ip. The conductor compound 61 can show on one side a printed card 66 on which the electronic control elements of the motor can be mounted. FIG. 7 shows a cross section through a motor, for example with a frame 5 as represented in FIG. 4c, where the axial fitting of the conductor compound 6 and of other motor elements can be seen. The frame 5 has here a flange 5", eventually with cooling ribs, what can serve as a cooler for motor heat or for the electronic components. The motor parts (rotor 2, stator 1, yokes 11, Hall sensor 31, conductor compound 6, power switch 21, windings 112–113, transmitter magnet 32 etc.) have the reference numerals from the preceding pages. A round end shield 8 with ball bearing closes the rotor space after assembly of the rotor 2. The frame according to FIG. 5c can preferably be used for the rotor of a machine with two independent rotors (see prior art), the frame (5) being then mounted on a hollow shaft and the magnets (10) being mounted without balance error and resistant to the centrifugal force. Thus, a motor is realized which is similar to the motor of FIG. 7, except the bearings and the current transmission (by slip rings).

The advantages of the construction according to the invention have been made clear in the course of the specification. Due to the extrusion coated magnets 10, the motor does not need any casing under normal conditions and has particularly good electrical and thermal properties due to the band winding with high filling factors. Should it be necessary for the protection of the conductor compound plate 6 or for the protection of the whole motor or for the noise reduction, the motor can be placed entirely or partially (only the connections and the electronics, for example) in an appropriate casing.

Figure 10:
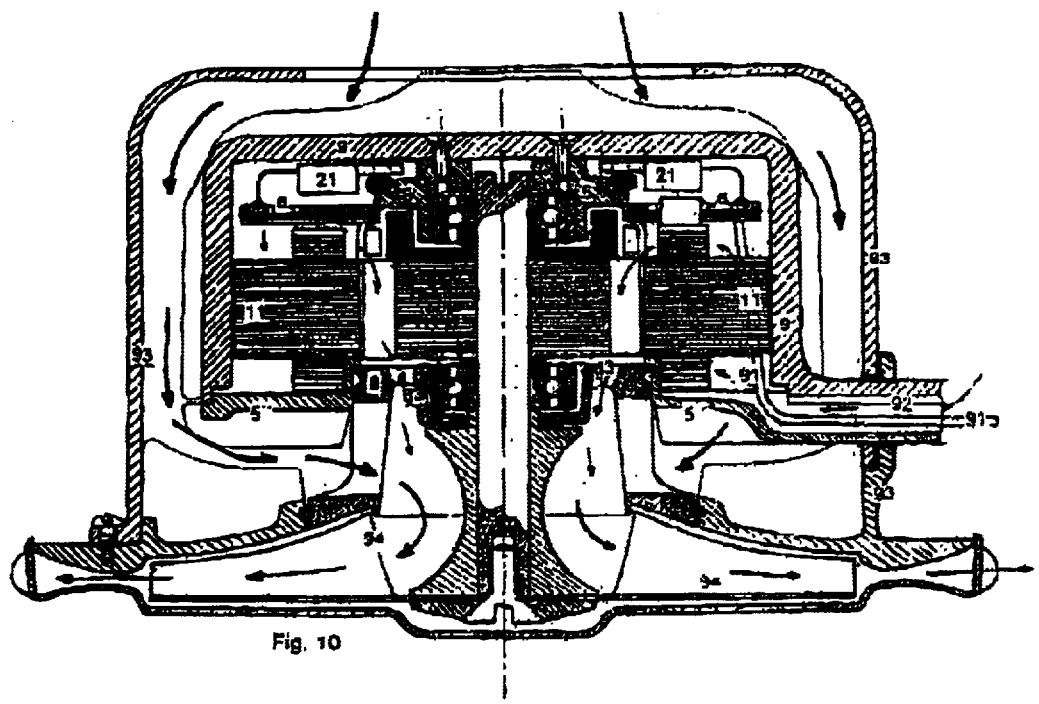

FIG. 10 shows the cross section of a motor/blower unit (for example for vacuum cleaners) with particular thermal characteristics which is possible by using the multifunctional frame 5 in connection with other construction solutions.

A part of the heat which develops in the windings can be directly dissipated on the flange 5" (with cooling ribs which are configured in an advantageous way for the flow). The lower side of the windings 112, 113 adheres to the flange 5" and transmits the heat by direct contact or over a heat conducting layer. The frictional heat of the lower bearing is also supplied to the flange 5" over the end shield feeding part 8. The power switches 21 are directly connected with the conductor compound 6, however dissipate the heat to a housing 9 which also dissipates the heat from the upper bearing over the frame 5.

The housing 9 is constructed in such a way that it is in thermal connection with the yokes 11 and is annexed to the flange 5" without a sealing. The connections 91 of the motor come out laterally from a flow casing 93 surrounding the motor by a tube-type line 92. The medium (air, eventually with impurities, see fat arrows) sucked by the blower 94 through the opening 95 of the flow casing 93 scavenges and thus efficiently cools the housing 9 and the flange 5" and thus the encapsulated motor. Here, dirt or water cannot penetrate into the motor, despite missing sealings because its housing 9 is situated inside a vacuum space (flow housing 93) so that a relative overpressure prevails in the motor space, all the more since clean air arrives into the motor space by the line 92.

If openings 83 are made for example in the end shield 8, a clean air cooling flow (thin arrows) can be purposefully led through the motor space, this flow mixing then with the unclean main air flow (fat arrows) at the outlet.

What is claimed is:

1. A field part, including a winding carrying part for providing a rotary field, of an electronically switched two-phase reluctance machine, the field part comprising:
    a plurality of individually wound U-shaped yoke assemblies, each assembly including winding carrying U-shaped magnets attached to a non-magnetic carrier frame, each yoke assembly having winding connections;
    a form-defined, axially mountable electric conductor compound which electrically interconnects the winding connections of the yoke assemblies; and
    power conducing electric components electrically connected to the electric conductor compound.

2. The field part of a reluctance machine of claim 1, including winding carriers having shoulders which serve to guide beginning ends of the windings at the start of a winding process and to insulate the beginning ends from each other.

3. The field part of a reluctance machine of claim 2, wherein the windings have openings received on a protrusion of the winding carrier so as to be fixed thereto.

4. The field part of a reluctance machine of claim 2, wherein the minding carriers each include lateral shoulders for retaining ends of the windings.

5. The field part of a reluctance machine of claim 1, wherein free ends of the windings defining the winding connections are folded to form plug lugs.

6. The field part of a reluctance machine of claim 5, wherein the U-shaped yoke assemblies are extrusion coated with an insulating mass and are sealed and held together to form a form a U-shaped magnet.

7. The field part of a reluctance machine of claim 6, wherein the extrusion coating of the U-shaped yoke assemblies consolidates and shapes the plug lugs of the windings.

8. The field part of a reluctance machine of claim 1, wherein the carrier frame includes a bearing carrying plate having columns which extend to a rear end shield, the columns being provided with an axial profile for the form-fit fixing of the U-shaped magnet, and wherein the columns are capable of being spread out to simplify the assembly of the field part.

9. The field part of a reluctance machine of claim 8, wherein the carrier frame comprises two substantially identical half frames having a predetermined number of columns which is the same or the half of the number of the U-shaped magnets which can be axially mounted on both sides thereof.

10. The field part of a reluctance machine of claim 8, wherein the carrier frame defines openings for the fixing of the U-shaped magnets.

11. The field part of a reluctance machine of claim 10, wherein the openings are formed in a front portion thereof by an end shield, laterally by two columns and at a rear by a ring flange of the carrier frame.

12. The field part of a reluctance machine of claim 8, wherein the U-shaped magnets are fixed in the frame by means of a tolerance compensating method in such a way that pole faces of the U-shaped magnets are brought to stop against a calibrating roll which having approximately the diameter of a rotor space centered in bearings such that the U-shaped magnets are fixed in this position.

13. The field part of a reluctance machine of claim 12, wherein the U-shaped magnets are pressed on the calibrating roll by an electromagnetic force.

14. The field part of a reluctance machine of claim 8, wherein the form-fit fixing of the U-shaped magnets is carried out by means of a hardenable material that is delivered in a non-hardened state into interconnected partial spaces between the U-shaped magnets which are to be fixed mutually and the frame.

15. The field part of a reluctance machine of claim 8, wherein the form-fit fixing of the U-shaped magnets is carried out by means of prefabricated parts inserted into interconnected spaces between the U-shaped magnets and the columns of the carrier frame.

16. The field part of a reluctance machine of claim 1, wherein the conductor compound comprises metallic conductor paths and an insulating carrier that electrically connect the power conducting electric components and the winding connections.

17. The field part of claim 16, wherein the conductor compound comprises punched conductor paths which are fixed on a plastic body by sticking, clipping, ultrasonic riveting or extrusion coating.

18. The field part of a reluctance machine of claim 17, wherein the punching of the conductor paths takes place in two phases in such a way that, prior to the final punching out, the conductor paths can be handled in all, together with the residual half-product out of which they have been cut, for an easier fixing on the carrier, before the final punching out of the conductor paths takes place by separating the edges.

19. The field part of a reluctance machine of claim 18, wherein extremities of the conductor paths have an electric contact with ends of the windings in the manner of plug-in connections.

20. The field part of a reluctance machine of claim 1, wherein there are loops of current outside the plane of the conductor compound.

21. The field part of a reluctance machine of claim 1, wherein the conductor compound has on a side thereof a printed card for weak current.

22. The field part of a reluctance machine of claim 1, wherein the field part is adapted as a rotor of a machine with two independent rotors, the carrier frame being mounted on a hollow shaft, and the U-shaped magnets being mounted without balance error and protected against the destruction by centrifugal forces.

23. The field part of a reluctance machine of claim 1, including a protective housing fixed to the carrier frame.

24. The field part of claim 23, wherein the field part is placed in a motor casing having a thermal contact with head loaded motor parts.

25. A field part accordingly to claim 24, wherein the motor casing is situated inside a housing-type section of a suction pipe and in association with a blower that creates an air flow that prevents dirt accumulation.

26. The field part of a reluctance machine of claim 1, wherein the wound conductors have variable cross sections along a winding so that each winding is thinner between limbs of the U-shaped yokes than on sides thereof.

\* \* \* \* \*

UNITED STATES PATENT AND TRADEMARK OFFICE
CERTIFICATE OF CORRECTION

PATENT NO. : 6,724,117 B1
DATED : May 11, 2004
INVENTOR(S) : Iancu Lungu

It is certified that error appears in the above-identified patent and that said Letters Patent is hereby corrected as shown below:

Column 7,
Line 32, change "conducing" to -- conducting --.
Line 42, change "minding" to -- winding --.

Signed and Sealed this

Thirtieth Day of November, 2004

JON W. DUDAS
*Director of the United States Patent and Trademark Office*